Figures 1, 2:
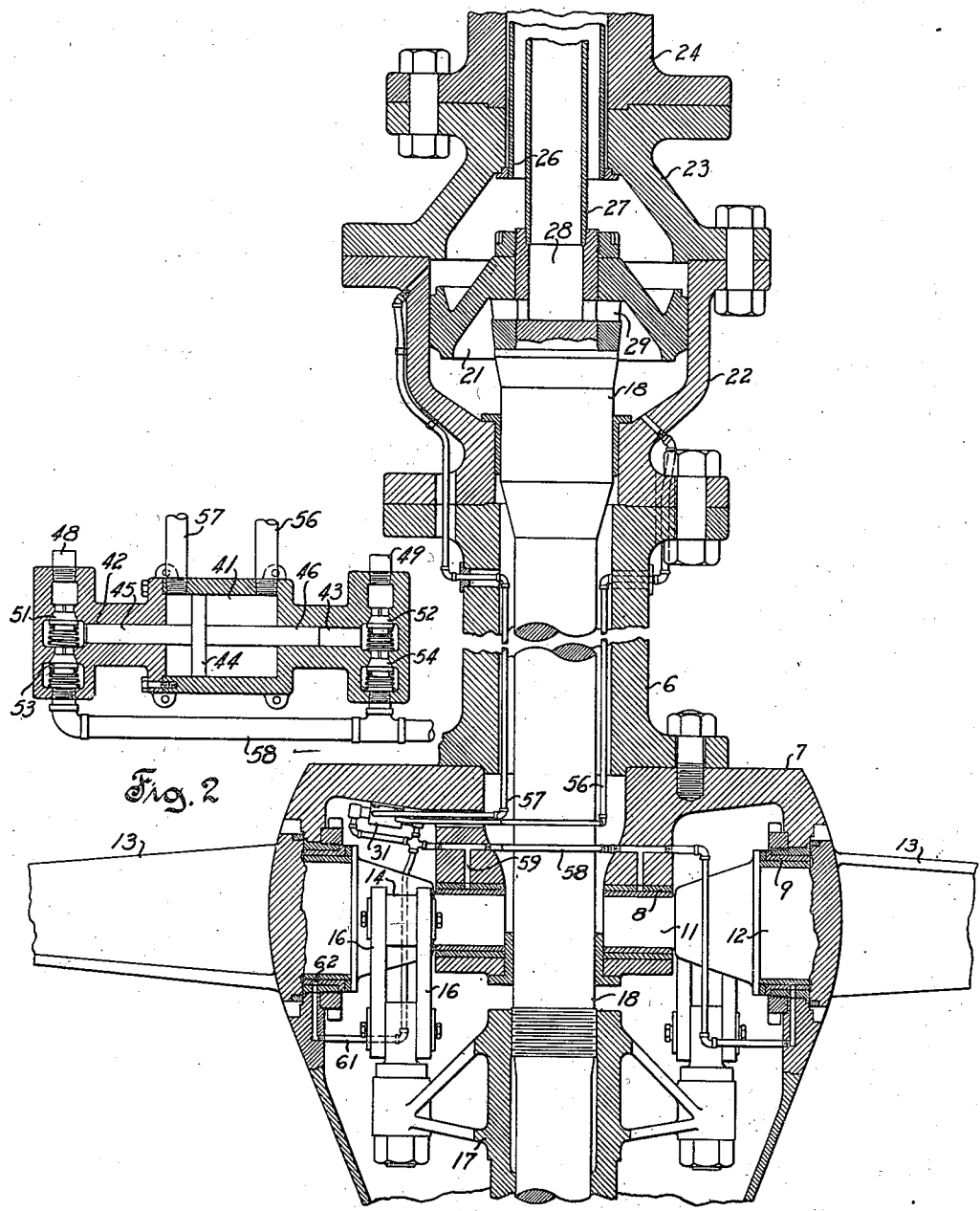

May 12, 1942. J. J. RING 2,283,128
TURBINE LUBRICATION
Filed June 13, 1940

Inventor
J. J. Ring
by
Attorney

Patented May 12, 1942

2,283,128

UNITED STATES PATENT OFFICE 2,283,128

TURBINE LUBRICATION

Joseph J. Ring, Wauwatosa, Wis., assignor to Allis-Chalmers Manufacturing Company, Milwaukee, Wis., a corporation of Delaware Application June 13, 1940, Serial No. 340,254

4 Claims. (Cl. 253—117)

This invention relates to improvements in hydraulic turbines of the adjustable runner vane type and more particularly to a system for lubricating the bearings of such runner vanes, in which lubricant is supplied under pressure to the bearings especially just prior to and during starting of any movement of such vanes.

Hydraulic turbines with runner vanes adjustable to various positions require that the vane bearings and pivots be lubricated to decrease resistance thereof to the turning movements. Such lubrication has heretofore been accomplished by filling the interior of the turbine runner hub with lubricant under sufficient pressure to induce a leakage of lubricant outwardly through the runner vane bearings. Such lubrication is not, however, adequate even for runners having vane areas such as are known at the present time and cannot be considered for the larger turbines which are now being proposed. The adjustable runner vanes of hydraulic turbines are usually moved only at infrequent intervals and under full operating hydraulic pressure which causes the pivots to exert great pressure for long periods of time on an axis diagonally through the bearings and results in forcing lubricant out of the bearings at points of high pressure on the outer lower and inner upper portions of the bearings, thus producing metal to metal contact between the pivots and the bearings at the high pressure points. It is therefore difficult to start such vanes moving from standstill due to the unlubricated condition of some portions of the bearings even though movement of the vanes after starting may be relatively easy.

It is therefore an object of the present invention to provide a lubricating system for the runner vane bearings of hydraulic turbines of the adjustable runner vane type, in which the lubricant is supplied to the bearings under pressure responsive to the actuation of the means for adjusting the runner vanes.

Another object of the present invention is to provide a hydraulic turbine of the adjustable runner vane type with a lubricating system which will provide lubricant to the runner vane bearings particularly prior to and during starting movement of such runner vanes.

Another object of the present invention is to provide a hydraulic turbine of the adjustable runner vane type with a pressure lubrication system, actuated by the means for adjusting the runner vanes, for supplying lubricant to the runner vane bearings under pressure prior to and during each movement of the runner vanes.

Objects and advantages other than those set forth will be apparent from the following description when read in connection with the accompanying drawing, in which:

Fig. 1 is a vertical sectional view of a portion of the runner of a hydraulic turbine of the adjustable runner vane type to illustrate particularly the bearings supporting the adjustable runner vanes, the means for adjusting the runner vanes and the manner in which the lubricant under pressure is supplied in a system interconnecting the bearings and the vane operating means; and Fig. 2 is an enlarged vertical section of the lubricant pressure pump which is actuated by the runner vane operating means for supplying lubricant under pressure to the bearings of the runner vanes.

Referring to the drawing by reference numerals, numeral 6 designates a hollow shaft to the lower end of which is attached a hub 7 in which are formed a plurality of bearings 8 and 9 to receive pivots 11 and 12 of runner vanes 13, the positions of which are to be adjusted by rotation of the pivots in the bearings. An arm 14 extends from each of the vanes internally of their pivots and is connected by way of link 16 with a cross head 17 mounted on an operating rod 18 extending through the shaft 6. The upper end of the operating rod 18 is connected with a piston 21 movable within a cylinder formed by two portions 22 and 23 connected respectively with the turbine shaft 6 and an upwardly extending hollow shaft 24 of a driven machine (not shown). The piston 21 and cylinder 22, 23 form a servomotor which is operated by fluid pressure supplied either to the upper side of the piston 21 by way of a pipe 26 extending through the shaft 24 or to the lower side of the piston 21 by way of a pipe 27 extending through the pipe 26 and connected with passageways 28 and 29 through the operating rod 18. Fluid pressure from a suitable source (not shown) is supplied to the pipes 26 or 27 under the control of one of the known types of valves used for such purposes and therefore not illustrated, and actuates servomotor 21, 22, 23 to cause movement of the runner vanes when required as is well known.

A pressure operated lubricant pump indicated generally at 31 is mounted inside the runner hub 7. The detailed structure of the lubricant pump 31 can be seen in Figure 2 as comprising a main or pressure cylinder 41 and two auxiliary or lubricating cylinders 42 and 43 extending from and connected with the ends of the main cylinder. A main or operating piston 44 is reciprocable in the main cylinder 41 and is guided in its movement by rods 45 and 46 extending from the main piston into the lubricant cylinders 42 and 43 and acting as plungers in such cylinders. Lubricant is drawn into the lubricating cylinders 42 and 43 through ports 48 or 49 controlled by spring pressed valves 51 and 52 respectively and is discharged from such cylinders 42 and 43 through valves 53 and 54 respectively. Pressure for operating the pump 31 is obtained from the servomotor 21, 22, 23 by way of pipes 56 and 57 connected respectively to the servomotor cylinder portion 22 below the servomotor piston 21 and to the servomotor cylinder portion 23 above the servomotor piston 21. Pressure acting in the pump 31 produces a discharge of lubricant from such pump by way of pipes 58 and passageways 59 to the bearings 8 and by way of pipes 61 and passageways 62 to the bearings 9.

In operation of the turbine, the runner vanes 13 are adjustable to the prevailing hydraulic head conditions by admission of fluid pressure to the servomotors 21, 22, 23 through either the pipe 26 or the pipe 27 and the passageways 28 and 29 to the upper or lower side of the piston 21 dependent on the direction in which the vanes must be rotated to produce the desired power under the then existing hydraulic conditions. Assuming that pressure is admitted to the upper side of the piston 21, such pressure will act through the pipe 57 on the left hand side of the pump piston 44 to force such piston and the plunger 46 toward the right. Lubricant cylinder 43 having been filled with lubricant from the interior of the hub 7 through the ports 49 and valve 52 when the plunger 46 moved toward the left, the present movement of the plunger 46 to the right forces lubricant out of the cylinder 43 through the valve 54, pipes 58 and passages 59 into the upper portions of the bearings 8 and through pipes 61, passages 62 into the lower portions of the bearings 9. During movement of the piston 44 and the plunger 45 toward the left, lubricant is drawn from the interior of the hub 7 through the port 48 and valve 51 into the cylinder 42 thus preparing such cylinder for discharge of lubricant through the same path as above stated for lubricant flow from the cylinder 43.

The relative dimensions and the resistance to movement of servomotor piston 21 and pump piston 44 are such as to cause movement of the pump piston through the full stroke before sufficient pressure is present to cause movement of the servomotor piston. It will thus be seen that the present invention provides a pressure lubrication system for the pivots of the adjustable runner vanes of a hydraulic turbine which system is operated automatically upon the operation of the runner vane actuating means and that lubricant is supplied to the critical portions of the bearings prior to and during starting movement of the runner vanes. Each movement of the runner vanes in either direction produces the discharge of a full charge of lubricant to each of the bearings and each movement of the lubricant pump piston immediately recharges one lubricant cylinder of the pump in preparation for the next movement of the runner vanes.

The pressure of the hydraulic head acting downwardly on the vanes 13 causes such vanes to react particularly on the inner ends of the upper portions of the bearings 8 and the outer ends of the lower portions of the bearings 9 to force lubricant out of such bearing portions and, dependent on the pressure exerted, may even produce metal to metal contact of the bearing surface portions with the adjacent pivot surfaces. The reaction or supporting action of the bearings 8 and 9 is, of course, different for different sizes of runner vanes and different heads. Consequently, the exact locations and sizes of the bearing surfaces on which the maximum pressure will be concentrated must be determined as is well known for each given set of turbine conditions. The precise points to which the passageways 59 and 62 lead in the bearings 8 and 9 are preferably determined for each specific turbine.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a hydraulic turbine of the type having vanes adjustably supported in bearings, a servomotor for adjusting said vanes, and a fluid pressure operated pump for supplying lubricant to the bearings of said vanes, the fluid pressure for operating said pump being supplied thereto from and causing operation of said pump prior to operation of said servomotor.

2. In a hydraulic turbine of the type having vanes adjustably supported in bearings, a fluid pressure operated servomotor for adjusting said vanes, and a fluid pressure operated pump for supplying lubricant to the bearings of said vanes, the fluid pressure for operating said pump being supplied thereto directly from and only prior to each initial operation of said servomotor in either direction.

3. In a hydraulic turbine of the type having vanes adjustably supported in bearings, a servomotor for adjusting said vanes and comprising a cylinder having a piston therein movable upon application of fluid pressure thereto, and a pump for supplying lubricant to the bearings of said vanes and comprising a cylinder having a piston movable therein upon application of fluid pressure thereto from said servomotor, the force to be overcome by the servomotor piston being greater than the force resisting movement of the pump piston to secure operation of said pump prior to operation of said servomotor.

4. In a hydraulic turbine of the type having runner vanes adjustably supported in bearings, a fluid pressure operated double acting servomotor for adjusting the runner vanes, a fluid pressure operated double acting pump for supplying lubricant to said bearings, a conduit connecting one side of said servomotor with one fluid pressure side of said pump, and a conduit connecting the other side of said servomotor with the other fluid pressure side of said pump, the resistance of the vanes to movement by said servomotor being greater than the resistance of the lubricant to discharge by said pump to the bearings.

JOSEPH J. RING.